Inventor
HENRY A. BERLINER
By Scrivener & Parker
Attorneys

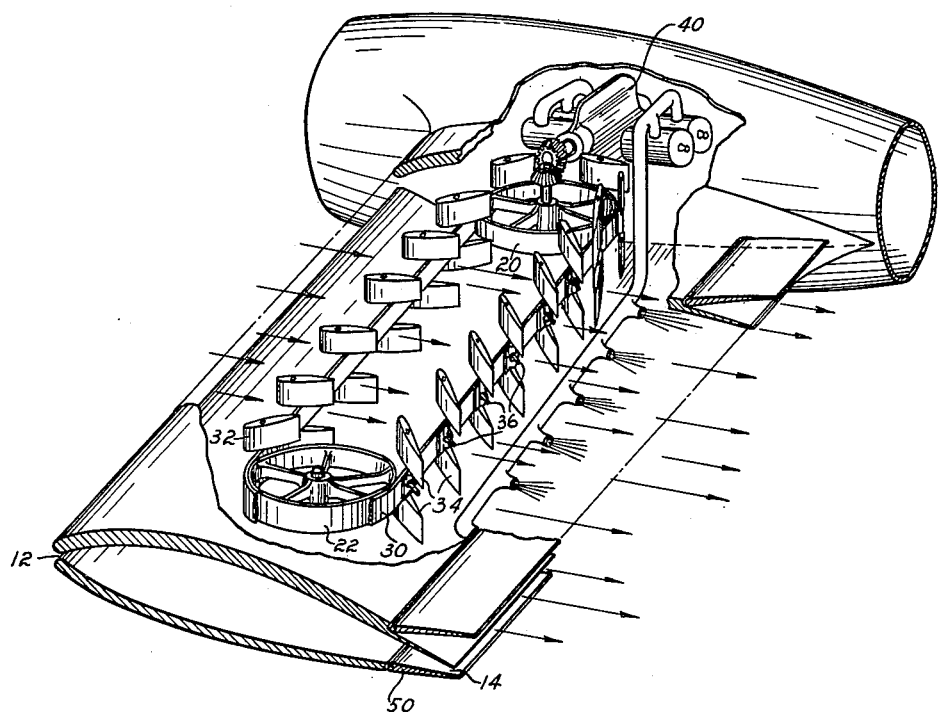

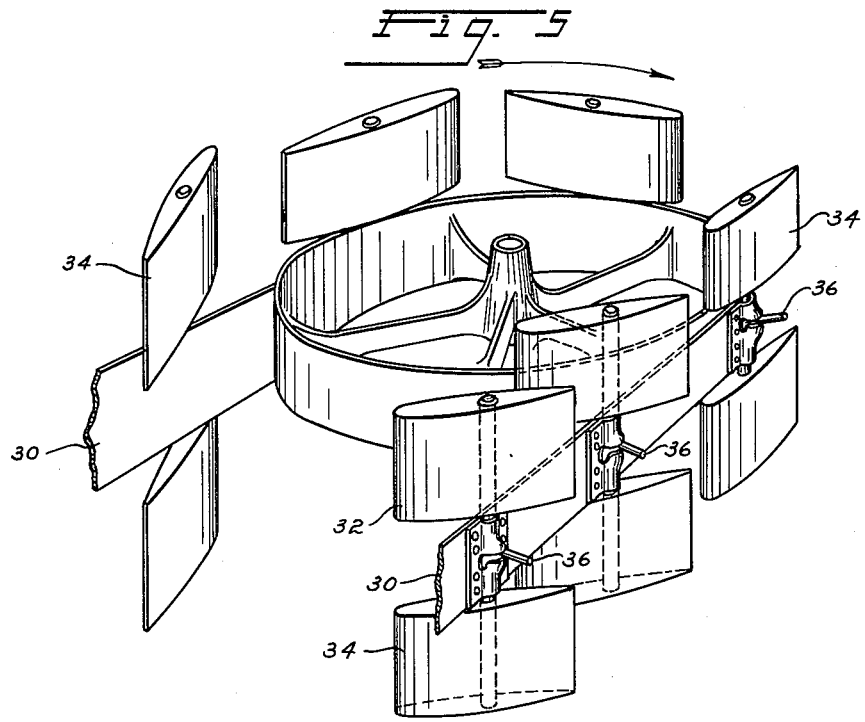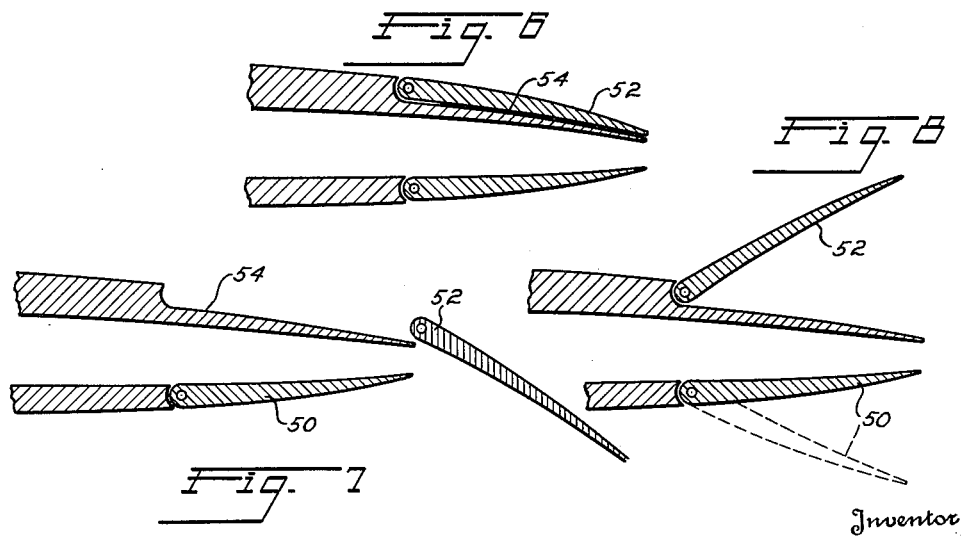

Patented May 20, 1952

2,597,610

UNITED STATES PATENT OFFICE 2,597,610

JET PROPULSION SYSTEM FOR AIRPLANES

Henry A. Berliner, Washington, D. C., assignor to Engineering and Research Corporation, Riverdale, Md., a corporation of Maryland Application June 12, 1945, Serial No. 598,968

1 Claim. (Cl. 244—15)

This invention relates to the propulsion of aircraft. It is the principal object of the invention to provide an aircraft having no external propulsive means such as propellers, and in which all propulsive means are disposed within elongated passages within the wing which open at the leading edge through an elongated air inlet passage and at the trailing edge through an elongated air discharge passage, whereby there is produced at the trailing edge of each wing an elongated slipstream within which a high-lift flap may be positioned and operated.

It is a further object of the invention to provide an airplane utilizing an added forward propulsive force heat energy which is added within the wing parrages within which the propulsive means are disposed. In this connection, it is a further object to provide means whereby the added heat energy is caused to increase the velocity of the stream issuing from the wing, whereby a forward propulsive force is produced.

Other objects and features of novelty of the invention will be made apparent by the following description and the annexed drawing, all of which are only illustrative of the invention and impose no limitation thereon not imposed by the appended claim.

Referring to the drawings, in which similar reference numerals refer to like parts, Fig. 1 is a partial top view of an airplane according to the invention having parts thereof broken away;

Fig. 4 is a perspective view showing parts of an airplane according to the invention;

Fig. 5 is a perspective view of parts of the propulsive mechanism illustrated in Figs. 1 to 4; and Figs. 6, 7 and 8 are sectional views of the trailing edge assembly showing various positions of the control surface and high-lift flap.

Figures 1, 2, 3:
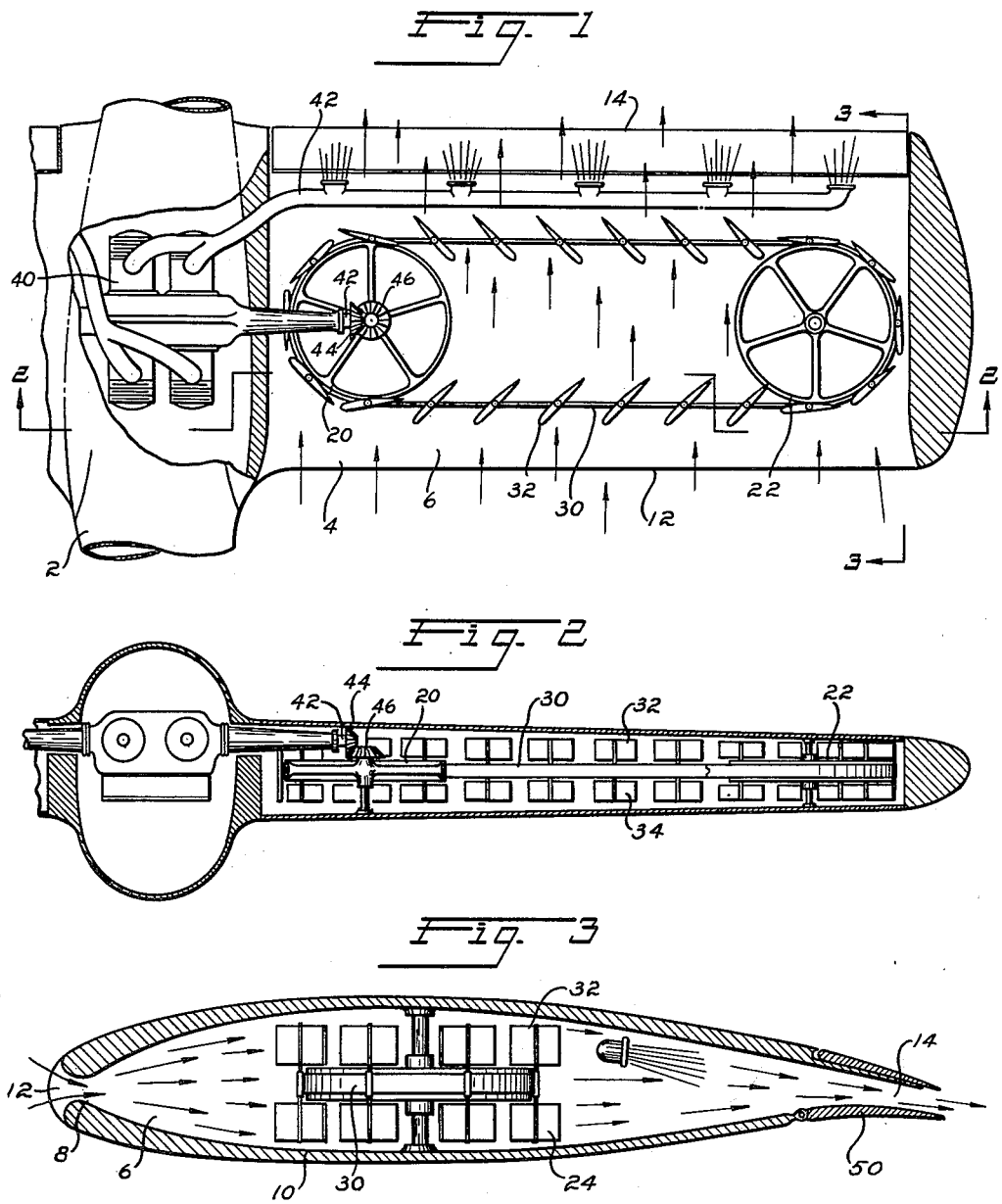
Fig. 2 is a sectional view taken on line A—A of Fig. 1.
Fig. 3 is a sectional view taken on line B—B of Fig. 1.

My invention provides a new and improved propulsive system for an airplane of the type having wings 4 and, preferably but not essentially, a fuselage 2. In accordance with my invention each of the wings is provided with a passage 6 extending therethrough from the leading edge region to the trailing edge region and extending throughout substantially the entire longitudinal length of the wing. Transversely of the wing the passage is preferably constricted adjacent the leading edge as shown at 8 and gradually increases in cross-section, as at 10, to a maximum dimension and then decreases to the trailing edge region. Each of the wing passages opens to atmosphere at or adjacent the leading edge of each wing through an elongated opening 12 which extends throughout the greater part of the length of the wing and at or adjacent the trailing edge through an elongated opening 14 which is preferably of substantially the same longitudinal extent as the leading edge opening.

Means are provided by the invention, which are disposed entirely within the wing passages, for causing a flow of air through each wing passage to thereby produce a forward propulsive effect on the airplane and such means are preferably not of the screw propeller type. A preferred form of air propulsive means is disclosed in the drawings and comprises two pulleys 20, 22 which are disposed within the wing passage and spaced longitudinally thereof with their axes substantially at right angles to the chord of the wing. An endless belt 30 passes about the pulleys and has rotatably mounted thereon vertical rods which carry airfoil-shaped vanes 32, 34 above and below the belt respectively. A pin 36 extends from each such rod exteriorly of the belt and is adapted to be engaged by fixed abutments located adjacent each pulley in order to move each vane to the positions which it must occupy as it passes adjacent the leading and trailing edges and about each pulley, as shown in Fig. 1. The pulleys and endless belt are driven by the engine 40, which is preferably mounted within the fuselage, through shaft 42 and gearing 44 which meshes with gearing 46 on the shaft of pulley 20 which is located nearest to the fuselage. Such air-propulsive means are disposed in each wing and are driven by the engine 40.

Means are provided by the invention for increasing the forward propulsive effect of the air-propelling means of the aircraft. In accordance with the invention this is effected by adding heat energy to the air flowing through the wing passages. I have found that when the wing is moving forwardly through the air the addition of heat energy to the air within the wing will cause the air stream at the exit opening to have greater total energy than that at the intake opening, this added energy appearing as an increased exit velocity or pressure or both. This added energy has the effect of increasing the forward propulsive effect of the air stream on the aircraft and this effect is further increased by the described shape of the wing passages transversely of the wing. It will be apparent, in this latter connection, that the air will expand as it moves into the increasing passage and will therefore decrease in velocity, thus more readily accepting the heat transfer.

Any suitable means may be utilized or provided for adding the heat to the air stream within the wing passages. Preferably, and as disclosed in the drawings, this is effected by passing the exhaust gases of the engine 40 through ducts 42 which are preferably disposed adjacent the trailing edge of the wing. Openings are preferably formed in these ducts, through which the exhaust gases escape into the air stream. Other suitable means may be provided or utilized for adding heat to the air stream within the wing passage and such means may be electric heaters, fuel burners, etc.

Means are provided by the invention for varying the size of the elongated exit opening of each wing in order to cause the added energy to appear in the exit stream at the optimum velocity for each operating condition of the aircraft. Such means preferably comprise an elongated member 50, which forms the trailing edge of the lower wing surface throughout the length of the trailing edge exit opening 14. This member is pivoted about a horizontal axis spaced forwardly of the trailing edge and may therefore be moved to closed and open positions as illustrated in full and dotted lines in Fig. 8 or to intermediate positions. Suitable means may be provided for operating these members. It will be apparent that if the member 50 is maintained in its closed position the velocity of the exit stream will be increased while if moved to one of its more open positions the pressure of the exit stream will be increased.

In addition to the adjustable surface 50, a high-lift flap 52 is provided for operation from a position within the upper surface of the trailing edge of the wing to one or more positions to the rear of the wing and within the airstream issuing from the trailing edge opening 14. The flap 52 forming part of each wing is preferably received into a recess 54 in the upper surface of the wing in its normal, inoperative position and is moved from such position by suitable means to the fully displaced position shown in Fig. 7, or to intermediate positions. In their operative positions the flaps 52 will be positioned within the elongated slipstream issuing from the trailing edge of each wing and may be operated within such slipstream issuing from the trailing edge of each wing and may be operated within such slipstream to effect a desired control action. Thus, the flaps of the two wings may be operated simultaneously in the same downward direction to produce a high lift effect or may be operated in conjunction with the control surfaces so as to provide aileron operation. This function of the high-lift flaps is permitted by pivoting them adjacent their leading edges, whereby each of these flaps has two movements, i. e. a translatory movement fore and aft of the wing, as shown in Fig. 7 and a pivotal movement as shown in Fig. 8.

While I have described and illustrated certain forms which my invention may take, it will be apparent to those skilled in the art that other embodiments as well as modifications of those disclosed may be practiced, all without departing in any way from the spirit or scope of the invention, for the limits of which reference must be had to the appended claim.

I claim:

An aircraft comprising wings, each wing having a passage extending therethrough parallel to the direction of motion of the aircraft and extending throughout substantially the entire length of the wing and opening to atmosphere through openings in the leading and trailing edge regions of the wing which are substantially co-extensive in length with said passage, a pair of pulleys rotatably mounted at the inboard and outboard ends of each wing passage, an endless belt mounted on each of said pair of pulleys, a plurality of vanes mounted on each endless belt and operative on movement of the belt about the pulleys to draw air into the leading edge opening of the wing and to force it out of the trailing edge opening, and means for rotating said pulleys.

HENRY A. BERLINER.

REFERENCES CITED

The following references are of record in the file of this patent:

UNITED STATES PATENTS

| Number | Name | Date |
| --- | --- | --- |
| 1,723,778 | Hall | Aug. 6, 1929 |
| 2,241,521 | Richard | May 13, 1941 |
| 2,352,062 | Zap | June 20, 1944 |
| 2,352,144 | Woods | June 20, 1944 |
| 2,388,247 | Berkow | Nov. 6, 1945 |
| 2,404,954 | Godsey | July 30, 1946 |

FOREIGN PATENTS

| Number | Country | Date |
| --- | --- | --- |
| 403,607 | Great Britain | Mar. 21, 1932 |
| 554,425 | Great Britain | July 2, 1943 |